US012737765B2

(12) United States Patent
Meyer et al.

(10) Patent No.: US 12,737,765 B2
(45) Date of Patent: Sep. 15, 2026

(54) VIRTUAL CREDENTIAL TO SUPPORT CONTINUITY FOLLOWING MIGRATION OF A DEACTIVATED CREDENTIAL

(71) Applicant: Capital One Services, LLC, McLean, VA (US)

(72) Inventors: Anthony Meyer, Henrico, VA (US); Ajay Kumar Chintireddy, Naperville, IL (US); Tanuj Chawla, Moseley, VA (US); Virginia Yozwiak, Ashburn, VA (US); Michelle M. Pries, Bloomingdale, IL (US); John Hagemann, Chicago, IL (US); Gunjan Sharma, Chantilly, VA (US)

(73) Assignee: Capital One Services, LLC, McLean, VA (US)

( * ) Notice: Subject to any disclaimer, the term of this patent is extended or adjusted under 35 U.S.C. 154(b) by 60 days.

(21) Appl. No.: 18/601,618

(22) Filed: Mar. 11, 2024

(65) Prior Publication Data

US 2025/0285116 A1 Sep. 11, 2025

(51) Int. Cl.
*G06Q 40/00* (2023.01)
*G06Q 20/38* (2012.01)
*G06Q 20/40* (2012.01)

(52) U.S. Cl.
CPC ..... *G06Q 20/4016* (2013.01); *G06Q 20/3821* (2013.01); *G06Q 20/409* (2013.01)

(58) Field of Classification Search
CPC ....................... G06Q 20/4016; G06Q 20/3821
See application file for complete search history.

(56) References Cited

U.S. PATENT DOCUMENTS 10,402,817 B1 * 9/2019 Benkreira .......... G06Q 20/4016
2005/0234822 A1 * 10/2005 VanFleet ................ G06Q 20/40 705/40

(Continued)

FOREIGN PATENT DOCUMENTS

EP 3910582 A1 * 11/2021 ............. G06Q 40/03
WO WO-2016086154 A1 * 6/2016 ......... G06Q 20/3226

OTHER PUBLICATIONS

Meirelles et al., "From private label to co-branded credit card: an assessment of the impact of a change in value proposition over customer value perception and company value capture," Springer Nature Link, Journal of Financial Services Marketing, 2021 (Year: 2021).*

(Continued)

*Primary Examiner* — Abhishek Vyas
*Assistant Examiner* — William B. Bunker
(74) *Attorney, Agent, or Firm* — Harrity & Harrity, LLP

(57) ABSTRACT

In some implementations, a system may receive information related to a virtual credential cross-referenced with a deactivated credential and a primary credential that replaces the deactivated credential. The system may receive a request to authorize a transaction using a physical transaction device associated with the deactivated credential. The system may obtain authorized user information associated with the virtual credential based on the request. The system may present an interface to validate an identity of a user attempting to authorize the transaction using the physical transaction device. The system may receive, via the interface, information related to the identity of the user attempting to authorize the transaction using the physical transaction device. The system may authorize the request based on the information related to the identity of the user attempting to authorize the (Continued)

transaction matching the authorized user information associated with the virtual credential.

20 Claims, 5 Drawing Sheets

(56) References Cited

U.S. PATENT DOCUMENTS

| | | | | |
|---|---|---|---|---|
| 2009/0119756 | A1* | 5/2009 | Acuna | G06Q 20/40 726/5 |
| 2009/0254462 | A1* | 10/2009 | Tomchek | G06Q 20/405 707/E17.014 |
| 2011/0302084 | A1* | 12/2011 | Melik-Aslanian | G06Q 20/354 705/44 |
| 2015/0058227 | A1* | 2/2015 | Dua | G06Q 20/3674 705/67 |
| 2017/0213212 | A1* | 7/2017 | Dicker | H04L 9/0894 |
| 2020/0118114 | A1* | 4/2020 | Benkreira | G06Q 20/385 |
| 2020/0134611 | A1* | 4/2020 | Grassadonia | G06Q 20/26 |
| 2020/0382514 | A1* | 12/2020 | Bulgakov | G06N 20/00 |
| 2021/0357941 | A1* | 11/2021 | Fort | G06Q 50/265 |
| 2022/0188391 | A1* | 6/2022 | Pai | G06Q 20/405 |
| 2025/0272372 | A1* | 8/2025 | Pai | G06F 21/31 |

OTHER PUBLICATIONS

Anonymous, "Keep card-on-file and recurring payment data current to increase approvals," Mastercard, Automatic Billing Update, 2015 (Year: 2015).*

Anonymous, "Credit card declines: Why they happen and what businesses need to know," Stripe, More resources/risk management 2023 (Year: 2023).*

* cited by examiner

200

VIRTUAL CREDENTIAL TO SUPPORT CONTINUITY FOLLOWING MIGRATION OF A DEACTIVATED CREDENTIAL

BACKGROUND

A virtual credential, sometimes referred to as a virtual payment credential, a virtual card number, and/or a virtual credit card, among other examples, is a computer-generated version of a primary payment credential (e.g., a credit card number). The virtual credential may be linked to the primary payment credential and used as a substitute for the primary payment credential in a transaction (e.g., when shopping online, by phone, or in other contexts where a transaction card is not required to be physically presented to a merchant). For example, a bank may issue a transaction card (e.g., a credit card), and a transaction management system of the bank may also issue one or more virtual card numbers that can be used with different merchant transaction systems. In this case, the transaction management system may configure each virtual credential to be associated with a particular merchant. For example, a first virtual credential may be usable with a first merchant only, a second virtual credential may be useable with a second merchant only, and so on. Each virtual credential may be linked to the primary credential in the transaction management system to enable transactions using a particular virtual credential to be charged to an account associated with the primary credential.

SUMMARY

Some implementations described herein relate to a system for processing requests associated with deactivated credentials. The system may include one or more memories and one or more processors communicatively coupled to the one or more memories. The one or more processors may be configured to receive, from a transaction backend system, information related to a virtual credential cross-referenced with a deactivated credential and a primary credential that replaces the deactivated credential, wherein the virtual credential is associated with a validity period. The one or more processors may be configured to receive, during the validity period, a request to authorize a transaction using a physical transaction device associated with the deactivated credential. The one or more processors may be configured to obtain authorized user information associated with the virtual credential based on the request to authorize the transaction using the physical transaction device associated with the deactivated credential. The one or more processors may be configured to present an interface to validate an identity of a user attempting to authorize the transaction using the physical transaction device. The one or more processors may be configured to receive, via the interface, information related to the identity of the user attempting to authorize the transaction using the physical transaction device. The one or more processors may be configured to process the request in accordance with the authorized user information associated with the virtual credential and the information related to the identity of the user attempting to authorize the transaction using the physical transaction device.

Some implementations described herein relate to a method for processing requests associated with deactivated credentials. The method may include receiving, by a system, information related to a virtual credential cross-referenced with a deactivated credential and a primary credential that replaces the deactivated credential, wherein the virtual credential is associated with a validity period. The method may include receiving, by the system and during the validity period, a request to authorize a transaction using a physical transaction device associated with the deactivated credential. The method may include obtaining, by the system, authorized user information associated with the virtual credential based on the request to authorize the transaction using the physical transaction device associated with the deactivated credential. The method may include presenting, by the system, an interface to validate an identity of a user attempting to authorize the transaction using the physical transaction device. The method may include receiving, by the system, via the interface, information related to the identity of the user attempting to authorize the transaction using the physical transaction device. The method may include authorizing the request based on the information related to the identity of the user attempting to authorize the transaction using the physical transaction device matching the authorized user information associated with the virtual credential.

Some implementations described herein relate to a non-transitory computer-readable medium that stores a set of instructions. The set of instructions, when executed by one or more processors of a system, may cause the system to receive, from a transaction backend system, information related to a virtual credential cross-referenced with a deactivated credential and a primary credential that replaces the deactivated credential, wherein the virtual credential is associated with a validity period. The set of instructions, when executed by one or more processors of the system, may cause the system to receive, during the validity period, a request to authorize a transaction using a physical transaction device associated with the deactivated credential. The set of instructions, when executed by one or more processors of the system, may cause the system to present an interface to validate an identity of a user attempting to authorize the transaction using the physical transaction device associated with the deactivated credential based on authorized user information associated with the virtual credential. The set of instructions, when executed by one or more processors of the system, may cause the system to receive, via the interface, information related to the identity of the user attempting to authorize the transaction using the physical transaction device. The set of instructions, when executed by one or more processors of the system, may cause the system to process the request in accordance with the authorized user information associated with the virtual credential and the information related to the identity of the user attempting to authorize the transaction using the physical transaction device.

DETAILED DESCRIPTION

The following detailed description of example implementations refers to the accompanying drawings. The same reference numbers in different drawings may identify the same or similar elements.

In some implementations, as described herein, a virtual credential, sometimes referred to as a virtual payment credential, a virtual credit card, and/or a virtual card number (VCN), may be used to temporarily enable one or more authorized users to enter into transactions using a physical transaction device (e.g., a plastic credit card or the like) associated with a deactivated credential (e.g., a private label credit card (PLCC)) after an account associated with the deactivated credential has been migrated to a primary credential associated with a primary account managed by a financial institution. For example, in some implementations, a transaction backend system may generate a virtual credential linked to the primary credential and to the deactivated credential, and the virtual credential may have a limited validity period (e.g., a quantity of days or months) and may be valid only for in-person transactions at transaction terminals associated with an entity (e.g., a merchant or store) that issued the deactivated credential. In some implementations, the transaction backend system may provide information related to the virtual credential to a transaction frontend system associated with the entity that issued the deactivated credential, and the transaction frontend system may then associate the virtual credential with the deactivated credential. Accordingly, in cases where a physical transaction device (e.g., a plastic credit card or the like) is presented at a transaction terminal associated with the entity that issued the deactivated credential, the transaction terminal and the transaction frontend system may perform various tasks to determine whether to authorize or reject (e.g., decline) the attempted transaction using the linked virtual credential in a manner transparent to the person presenting the physical transaction device (e.g., depending on whether the limited validity period has expired and/or whether the person presenting the physical transaction device satisfactorily proves their identity as an authorized user).

Figure 1A:
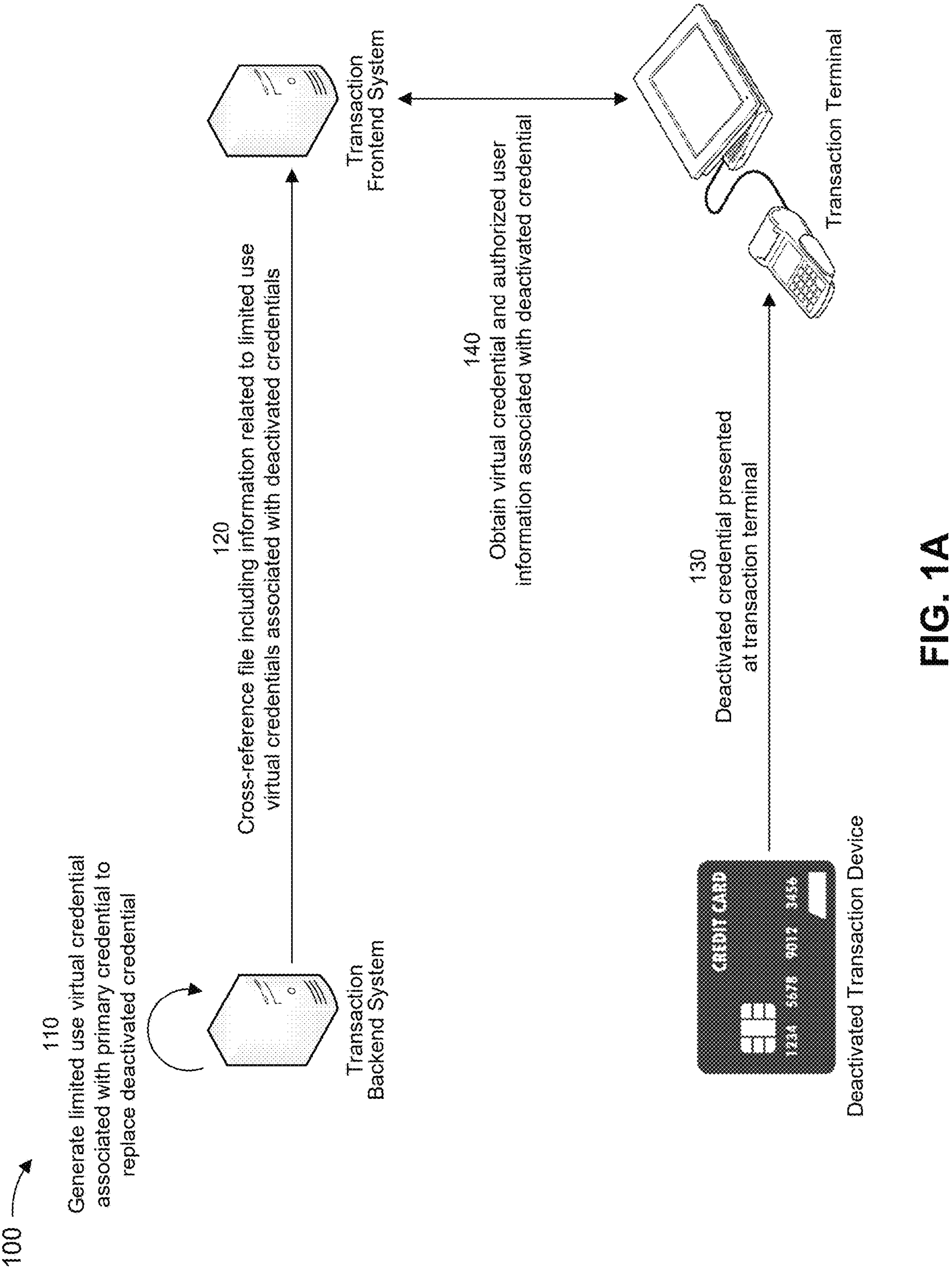
FIGS. 1A-1B are diagrams of an example associated with a virtual credential to support continuity following migration of a deactivated credential, in accordance with some embodiments of the present disclosure.
Figure 1B:
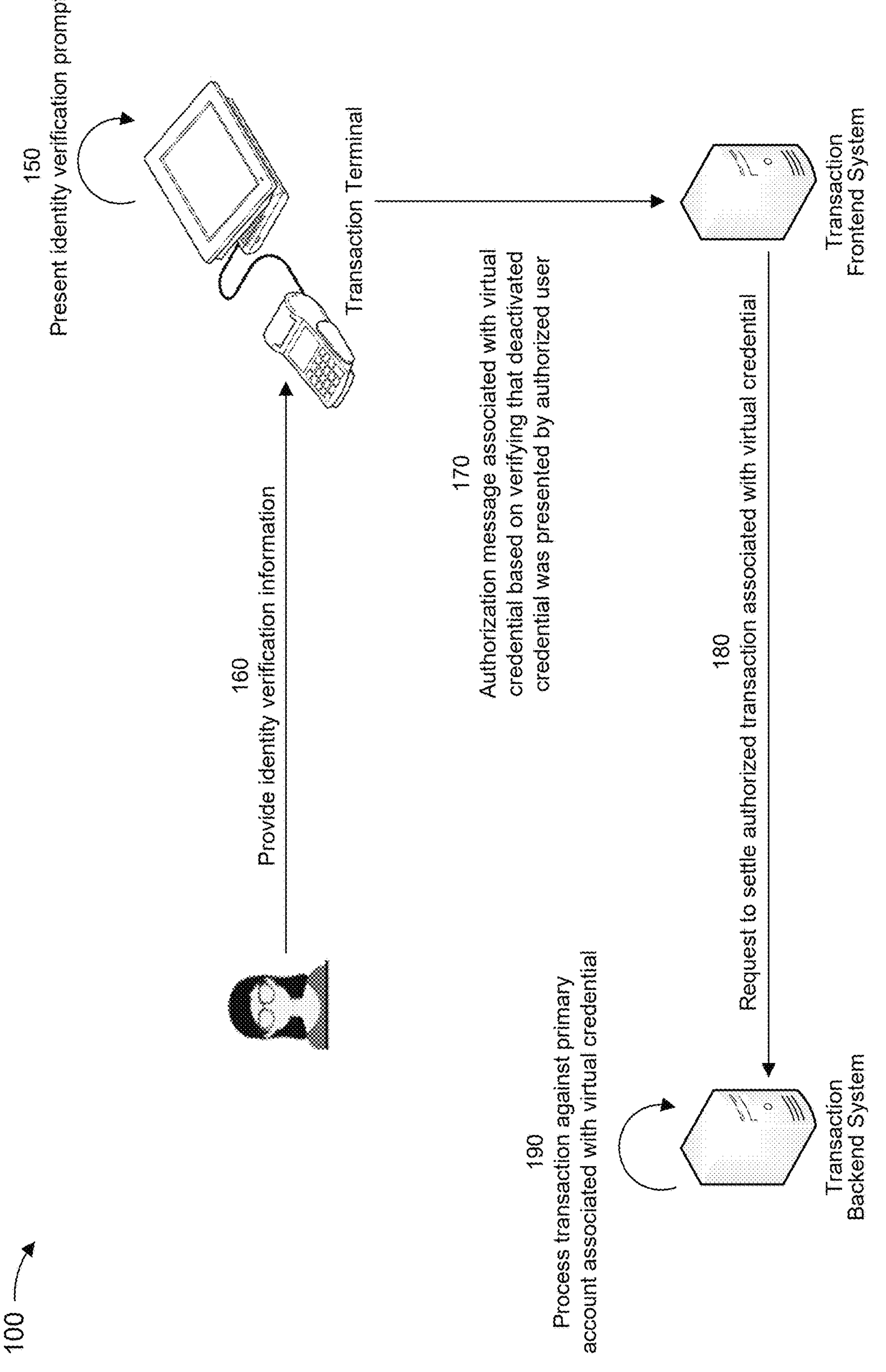

FIGS. 1A-1B are diagrams of an example 100 associated with a virtual credential to support continuity following migration of a deactivated credential. As shown in FIGS. 1A-1B, example 100 includes a transaction backend system, a transaction frontend system, a transaction terminal, and a transaction device associated with a deactivated payment credential. The transaction backend system, the transaction frontend system, the transaction terminal, and the transaction device are described in more detail in connection with FIG. 2 and FIG. 3.

As shown in FIG. 1A, and by reference number 110, the transaction backend system may generate a limited use virtual credential associated with a primary credential that replaces a deactivated credential. For example, as described herein, the deactivated credential may correspond to a PLCC, which is a merchant-branded credit card that is only valid at transaction terminals associated with the merchant that issued the PLCC. The PLCC is generally unaffiliated with transaction card associations or credit card networks (e.g., VISA® or MASTERCARD®) and not accepted by other merchants. PLCCs allow merchants to offer more lenient credit terms to users than they otherwise could and provide customers with the convenience of a credit card and deferred payments. In addition, when a customer enters into a transaction with a PLCC, the customer may earn loyalty rewards, such as a discount on a future purchase, and PLCCs can also offer convenience through features such as returns without receipts. However, PLCCs have several security flaws and other technical limitations. For example, a PLCC typically does not have the same security features that are available through major credit cards, such as advanced fraud detection systems or chip and personal identification number (PIN) technology. Furthermore, because a PLCC is often linked to a specific merchant, PLCCs present an easy target for targeted phishing scams in which malicious actors impersonate the issuing merchant. PLCCs also have less rigorous application procedures, which increases the risk of identity fraud, and merchant transaction systems may be less secure than transaction systems managed by financial institutions, which increases the risk of a data breach.

Accordingly, to increase security, reduce a fraud risk, reduce a data breach risk, or the like, the transaction backend system may issue primary credentials associated with a transaction card association or credit card network to replace PLCCs associated with one or more merchants (e.g., to migrate or convert accounts associated with the PLCCs to accounts associated with the primary credentials). For example, in some implementations, the transaction backend system may be associated with a financial institution, such as a bank, a lender, a credit card company, or a credit union, and the transaction backend system may receive information associated with authorized users of the PLCCs to be replaced by the primary credentials. For example, each PLCC may be associated with an account that includes information associated with authorized users, such as names, addresses, telephone numbers, social security numbers, or the like, which the transaction backend system may associate with the accounts that correspond to the primary credentials associated with the transaction card association or credit card network. In some implementations, the primary credentials that replace the PLCCs may be co-branded credit cards, which are credit cards that merchants or other entities offer in partnership with a credit card issuer or credit card network. Accordingly, the PLCCs may be deactivated, and physical transaction devices (e.g., plastic credit cards) that bear a logo of the credit card issuer (or credit card network) and the merchant may be created and mailed or otherwise sent to the authorized users of the primary credentials that were created to replace the deactivated PLCCs.

In this way, the authorized users can then use the physical transaction devices associated with the primary credentials to enter into transactions at the sponsoring merchant, which may allow the authorized users to earn merchandise discounts, points, rewards, or other benefits in a similar manner as the deactivated PLCC. In addition, because the new primary credentials are associated with a transaction card association or credit card network, the primary credentials can be used to enter into a transaction at any merchant that accepts payment credentials associated with the transaction card association or credit card network. However, in some cases, users associated with the deactivated PLCCs may present their deactivated physical transaction devices for in-person transactions in a post-conversion or post-migration time period. For example, some users may forget to bring the physical transaction device associated with the new primary credential and/or may not be aware that the deactivated PLCC was migrated or converted to the new primary credential. In such cases, presenting the deactivated physical transaction device at a transaction terminal in an attempt to enter into a transaction may result in various technical issues. For example, when the transaction is attempted, various network and system resources are consumed when authorization for the transaction is requested and ultimately declined. In addition, declined transaction incidents may lead to calls or inquiries to customer service personnel to resolve confusion about the declined transaction.

Accordingly, in order to conserve the system and/or network resources that may be consumed when a user presents a deactivated physical transaction device after an account associated with the deactivated physical transaction device has been migrated or converted to a primary account associated with a transaction card association or credit card network (e.g., from a PLCC to a co-branded credit card), the transaction backend system may generate a unique limited use virtual credential associated with each account to temporarily allow authorized users to enter into in-person transactions using the deactivated physical transaction device. For example, in some implementations, the limited use virtual credential associated with each account may be bound to the merchant that issued the deactivated physical transaction device, such that the deactivated physical transaction devices can only be used to enter into in-person transactions at transaction terminals associated with the merchant bound to the virtual credentials. Furthermore, in some implementations, the virtual credentials may be associated with one or more additional parameters that limit when and/or how many times the deactivated physical transaction devices can be presented for in-person transactions. For example, in some implementations, the virtual credentials may have a limited validity period, such as 60 days or another suitable time period, and/or may be limited to a quantity of transactions (e.g., may be automatically disabled after the limited validity period has elapsed and/or the virtual credentials have been used to enter into the configured quantity of transactions). In addition, to reduce a fraud risk, the virtual credential associated with each deactivated credential may be associated with a policy that the virtual credential will not be reissued if deactivated, lost, stolen, or associated with a fraud report.

As further shown in FIG. 1A, and by reference number 120, the transaction backend system may provide, to the transaction frontend system, a cross-reference file that includes information related to the limited use virtual credentials that were generated to enable temporary use of physical transaction devices associated with the deactivated credentials. As described herein, the transaction frontend system may be associated with the merchant or entity that issued the deactivated credentials that were migrated or converted to the primary credentials associated with the transaction backend system. For example, as described herein, each virtual credential in the cross-reference file may be associated with a deactivated credential (e.g., a deactivated PLCC) that has been migrated or converted to a primary credential managed through the transaction backend system. Furthermore, in some implementations, the cross-reference file may associate each virtual credential with one or more surrogate account identifiers (SAIDs) associated with one or more authorized users of the primary credential. As described herein, a SAID may correspond to a tokenized account number (e.g., associated with the transaction backend system). For example, in some implementations, the tokenized account number (or account identifier) may correspond to a parent identifier associated with one or more credit card numbers, one or more VCNs, a line of credit, or other suitable account attributes.

Accordingly, as described herein, a SAID may correspond to a tokenized account identifier that a tokenization component associated with the transaction backend system may generate from a parent account identifier associated with the primary credential that replaces the deactivated credential. For example, a token that is generated by the tokenization component may have a type (e.g., a social security number token, an account number token, a primary account number (PAN) token, or the like). When tokenizing the parent account number to generate the SAID, the tokenization component may receive a sensitive data attribute (e.g., an account number) and a field type, securely store the sensitive data attribute, and then creates a randomly generated token associated with the sensitive data attribute. In this way, the token (or SAID) may provide a consistent and recoverable replacement for the sensitive data attribute. For example, to detokenize, the tokenization system may receive an input that includes a token and a field type, look up the sensitive data attribute associated with the token, and output the sensitive data attribute (e.g., an example three digit data attribute of "123" may be tokenized as "ABC", such that any system that uses the tokenization component to detokenize "ABC" would obtain "123" and vice versa). In this way, the SAID or tokenized account number may be used by the transaction backend system and/or the transaction frontend system in place of the sensitive data attribute used to generate the SAID or tokenized account number.

Accordingly, as described herein, the transaction frontend system may use the SAID to look up the virtual credential associated with a user when a deactivated credential is used. For example, in some implementations, each authorized user may have a social security number or other suitable unique identification information stored on file at the transaction backend system (e.g., in association with the primary credential) and at the transaction frontend system (e.g., in association with the deactivated credential). Accordingly, the SAID may be generated by tokenizing unique identification information associated with each authorized user, such as a social security number, such that the SAID can be used to verify the identity of a person who presents the deactivated physical transaction card.

For example, in some implementations, the transaction backend system may provide the SAID(s) associated with each virtual credential to the transaction frontend system (e.g., in the cross-reference file). In some implementations, as described herein, the transaction frontend system may store the cross-reference file that includes the information related to the limited use virtual credentials in a cross-reference data repository to enable subsequent lookups when a physical transaction device associated with a deactivated credential is presented at a transaction terminal associated with the transaction frontend system. For example, in some implementations, the cross-reference data repository may store VCNs, account numbers, or the like corresponding to each virtual credential, and each VCN, account number, or the like may be associated with an account number associated with the deactivated credential and one or more SAIDs associated with the authorized users of the virtual credential. To the transaction frontend system, the SAID functions as a generic account identifier that links various transactions and associated credit card numbers or virtual credentials together (e.g., that the SAID is a token is transparent to the transaction frontend system, and the transaction frontend system does not detokenize the SAID). In this way, the SAID may enable the transaction frontend system to associate PAN, VCN, and/or PLCC numbers with an account without the transaction backend system having to share the sensitive account number or other sensitive data attributes. Furthermore, in some implementations, the SAID may address issues related to having multiple card numbers or account identifiers associated with a single account. For example, using a PAN as an account number to manage attributes such as a customer identifier and/or rewards information may be problematic in various cases, including when a credential associated with the PAN is lost, stolen, or associated with fraud, when one or more virtual credentials are linked to the PAN, and/or when there are additional authorized users that are issued their own credential (and therefore a unique PAN). In such cases, a new account would need to be created for each new card or virtual credential, which may complicate operations such as rewards tracking. Accordingly, some implementations described herein may leverage the use of a common identifier (e.g., the SAID) to link various account identifiers (e.g., a PAN, VCN, and PLCC) without the risk of providing or otherwise exposing the actual account number.

For example, as further shown in FIG. 1A, and by reference number 130, the physical transaction device associated with a deactivated credential (e.g., a deactivated PLCC) may be presented at a transaction terminal associated with the merchant or other entity that originally issued the deactivated credential. In some implementations, the transaction terminal may then determine that the physical transaction device is invalid due to the migration or conversion to the primary credential that is managed through the transaction backend system. For example, when the physical transaction device associated with the deactivated credential is presented at the transaction terminal, a request associated with the deactivated credential may be routed to the transaction frontend system, which executes a transaction processing application (e.g., a FiServ or other suitable application) that declines the transaction because the physical transaction device is no longer valid. The transaction terminal may then initiate a lookup procedure using the deactivated credential associated with the physical transaction device to determine whether to authorize the transaction using the virtual credential linked to the deactivated credential.

For example, as further shown in FIG. 1A, and by reference number 140, the transaction terminal may communicate with the transaction frontend system to obtain information related to a virtual credential associated with the deactivated credential and information associated with one or more authorized users of the virtual credential. For example, in some implementations, the transaction terminal may initiate an application program interface (API) call to the cross-reference data repository using the account number corresponding to the deactivated credential associated with the physical transaction device that was presented at the transaction terminal. In some implementations, in cases where the cross-reference data repository does not include a virtual credential associated with the deactivated credential, the transaction frontend system may send a message to the transaction terminal indicating that no match was found, and a transaction decline processing flow may be carried out based on the deactivated credential failing to match any virtual credential. Alternatively, the transaction frontend system may send a message that results in the decline processing flow being carried out in cases where the physical transaction device is presented after the limited validity period of the virtual credential has elapsed, the virtual credential has been used a threshold quantity of times, and/or fraud has been reported for the virtual credential. Alternatively, in cases where the cross-reference data repository includes a virtual credential associated with the deactivated credential, the transaction frontend system may send a message to the transaction terminal that indicates the VCN or account number associated with the virtual credential linked to the deactivated credential and the one or more SAIDs associated with the authorized users if the physical transaction device is presented during the limited validity period of the virtual credential, before the virtual credential has been used the threshold quantity of times, and there are no fraud reports associated with the virtual credential. The transaction terminal may then initiate an authentication flow to verify that the person presenting the physical transaction device associated with the deactivated credential is an authorized user associated with the virtual credential.

In particular, as shown in FIG. 1B, and by reference number 150, the transaction terminal may present an identity verification prompt (e.g., an interface on a display screen) to the person presenting the physical transaction device associated with the deactivated credential. For example, in some implementations, the identity verification prompt may include one or more fields or other input modalities to obtain information to verify the identity the person presenting the physical transaction device associated with the deactivated credential. For example, as described herein, each virtual credential that is associated with a deactivated credential may be associated with one or more SAIDs that are derived from information associated with authorized users of the virtual credential, such as social security numbers or other suitable unique identifying information that is stored on file at the transaction frontend system (e.g., in connection with the initial issuance of the deactivated credential) and the transaction backend system (e.g., in connection with the issuance of the primary credential to replace the deactivated credential). Accordingly, as shown by reference number 160 in FIG. 1B, the person attempting to use the physical transaction device associated with the deactivated credential may provide identity verification information via the identity verification prompt. For example, the person attempting to use the physical transaction device may enter their social security number into a keypad or pin pad, or they may provide other suitable identifying information corresponding to the identifying information that was used to generate the SAID(s) associated with the virtual credential. In some implementations, the transaction terminal may then invoke a suitable API to generate a SAID based on the information entered into the identity verification prompt.

For example, in some implementations, the transaction terminal may invoke an arithmetic logic unit (ALU) API, where an input to the ALU API is the information entered into the identity verification prompt and an output returned by the ALU API is a SAID that is cryptographically bound to the content used to generate the SAID. In some implementations, in cases where the transaction terminal determines that there is no deactivated credential associated with the SAID that was generated from the information entered into the identity verification prompt, the transaction terminal perform the decline processing flow (e.g., the information entered into the identity verification prompt fails to match an authorized users of any of the deactivated credentials that have been migrated or converted, and therefore cannot match a SAID associated with any of the virtual credentials associated with the primary accounts to which the deactivated credentials have been migrated or converted). Alternatively, in cases where the SAID that was generated from the information entered into the identity verification prompt matches a SAID associated with an authorized user of a deactivated credential, the transaction terminal may determine whether the SAID that was generated from the information entered into the identity verification prompt matches any of the one or more SAIDs associated with authorized users of the virtual credential associated with the deactivated physical transaction device. In some implementations, if the SAID generated from the information entered into the identity verification prompt fails to match any of the one or more SAIDs associated with authorized users of the virtual credential, the transaction terminal may perform the decline processing flow. Otherwise, as shown by reference number 170, if the SAID generated from the information entered into the identity verification prompt matches a SAID associated with authorized users of the virtual credential, the transaction terminal may send, to the transaction frontend system, an authentication message associated with the virtual credential based on verifying that the physical transaction device associated with the deactivated credential was presented by an authorized user.

As further shown in FIG. 1B, and by reference number 180, the transaction frontend system may then send a request to the transaction backend system to settle the transaction that was authorized based on the virtual credential associated with the deactivated credential. For example, in some implementations, the request sent to the transaction backend system may identify the virtual credential linked to the deactivated credential associated with the physical transaction device and the request may further include an authorization code that indicates that the physical transaction device was present (e.g., authorization code 90). Furthermore, in some implementations, the request may include a unique transaction identifier to indicate that the transaction was authorized using a limited use virtual credential associated with a deactivated credential (e.g., to allow unique handling for transactions made using the virtual credentials when downstream fraud scenarios are reported). As further shown in FIG. 1B, and by reference number 190, the transaction backend system may then authorize and settle the transaction via standard authorization and settlement processes, using the virtual credential provided by the transaction frontend system. For example, in some implementations, the transaction backend system may charge the transaction to the primary account that replaced the deactivated credential associated with the virtual credential. Furthermore, the transaction backend system may increment the quantity of transactions associated with the virtual credential, such that subsequent attempts to use the physical transaction device associated with the deactivated credential may be authorized or declined depending on whether the maximum quantity of transactions has been reached. Furthermore, in some implementations, the virtual credential may be included in both authorization and settlement files associated with the transaction, which may allow business-as-usual (BAU) revocation of the virtual credential if fraud is later reported.

As indicated above, FIGS. 1A-1B are provided as an example. Other examples may differ from what is described with regard to FIGS. 1A-1B.

Figure 2:
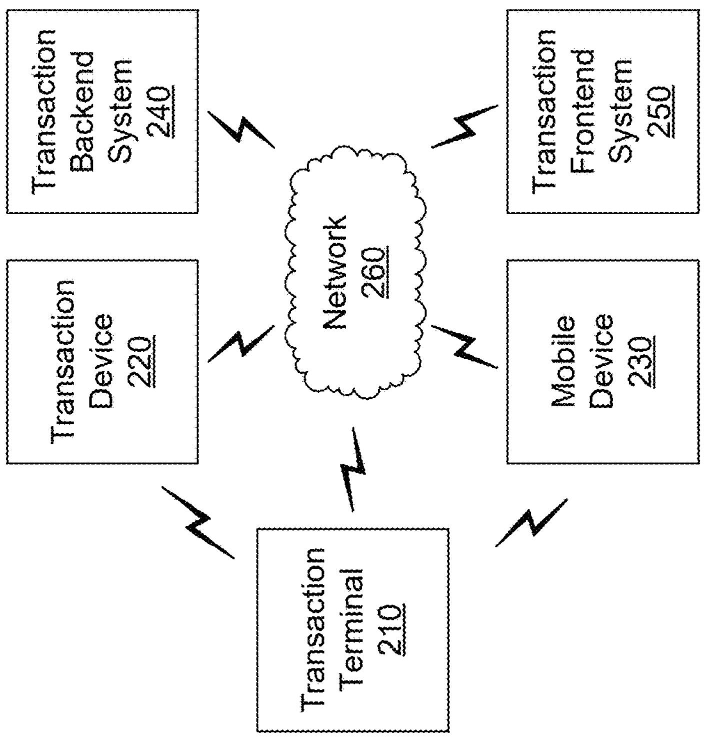
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a transaction terminal 210, a transaction device 220, a mobile device 230, a transaction backend system 240, a transaction frontend system 250, and a network 260. Devices of environment 200 may interconnect via wired connections and/or wireless connections.

The transaction terminal 210 may include one or more devices capable of facilitating an electronic transaction associated with the transaction device 220. For example, the transaction terminal 210 may include a point-of-sale (POS) terminal, a payment terminal (e.g., a credit card terminal, a contactless payment terminal, a mobile credit card reader, or a chip reader), and/or an automated teller machine (ATM). The transaction terminal 210 may include one or more input components and/or one or more output components to facilitate obtaining data (e.g., account information) from the transaction device 220 and/or to facilitate interaction with and/or authorization from a person presenting the transaction device 220 at the transaction terminal 210 (e.g., to verify that the person is an owner, accountholder, or authorized user of the transaction device 220). Example input components of the transaction terminal 210 include a number keypad, a touchscreen, a magnetic stripe reader, a chip reader, and/or a radio frequency (RF) signal reader (e.g., a near-field communication (NFC) reader). Example output devices of transaction terminal 210 include a display and/or a speaker.

The transaction device 220 may include one or more devices capable of being used for an electronic transaction. In some implementations, the transaction device 220 may include a transaction card (or another physical medium with integrated circuitry) capable of storing and communicating account information, such as a credit card, a debit card, a gift card, an ATM card, a transit card, a fare card, and/or an access card. In some implementations, the transaction device 220 may be the mobile device 230 or may be integrated into the mobile device 230. For example, the mobile device 230 may execute an electronic payment application capable of performing functions of the transaction device 220 described herein. Thus, one or more operations described herein as being performed by the transaction device 220 may be performed by a transaction card, the mobile device 230, or a combination thereof.

The transaction device 220 may store account information associated with the transaction device 220, which may be used in connection with an electronic transaction facilitated by the transaction terminal 210. The account information may include, for example, an account identifier that identifies an account (e.g., a bank account or a credit account) associated with the transaction device 220 (e.g., an account number, a card number, a bank routing number, and/or a bank identifier), a cardholder identifier (e.g., identifying a name of a person, business, or entity associated with the account or the transaction device 220), expiration information (e.g., identifying an expiration month and/or an expiration year associated with the transaction device 220), and/or a credential (e.g., a payment token). In some implementations, the transaction device 220 may store the account information in tamper-resistant memory of the transaction device 220, such as in a secure element. As part of performing an electronic transaction, the transaction device 220 may transmit the account information to the transaction terminal 210 using a communication component, such as a magnetic stripe, an integrated circuit (IC) chip (e.g., a EUROPAY®, MASTERCARD®, VISA® (EMV) chip), and/or a contactless communication component (e.g., an NFC component, an RF component, a Bluetooth component, and/or a Bluetooth Low Energy (BLE) component). Thus, the transaction device 220 and the transaction terminal 210 may communicate with one another by coming into contact with one another (e.g., using a magnetic stripe or an EMV chip) or via contactless communication (e.g., using NFC).

The mobile device 230 may include one or more devices capable of being used for an electronic transaction, as described above in connection with the transaction device

220. The mobile device 230 may include a communication device and/or a computing device. For example, the mobile device 230 may include a wireless communication device, a mobile phone, a user equipment, a tablet computer, a wearable communication device (e.g., a smart wristwatch, a pair of smart eyeglasses, a head mounted display, or a virtual reality headset), or a similar type of device. Additionally, or alternatively, the mobile device 230 may be capable of receiving, generating, storing, processing, and/or providing information associated with a virtual credential to support continuity following migration of a deactivated credential, as described herein.

The transaction backend system 240 may include one or more devices capable of processing, authorizing, and/or facilitating a transaction. For example, the transaction backend system 240 may include one or more servers and/or computing hardware (e.g., in a cloud computing environment or separate from a cloud computing environment) configured to receive and/or store information associated with processing an electronic transaction. The transaction backend system 240 may process a transaction, such as to approve (e.g., permit, authorize, or the like) or decline (e.g., reject, deny, or the like) the transaction and/or to complete the transaction if the transaction is approved. The transaction backend system 240 may process the transaction based on information received from the transaction terminal 210, such as transaction data (e.g., information that identifies a transaction amount, a merchant, a time of a transaction, a location of the transaction, or the like), account information communicated to the transaction terminal 210 by the transaction device 220, and/or information stored by the transaction backend system 240 (e.g., for fraud detection).

The transaction backend system 240 may be associated with a financial institution (e.g., a bank, a lender, a credit card company, or a credit union) and/or may be associated with a transaction card association that authorizes a transaction and/or facilitates a transfer of funds. For example, the transaction backend system 240 may be associated with an issuing bank associated with the transaction device 220, an acquiring bank (or merchant bank) associated with the merchant and/or the transaction terminal 210, and/or a transaction card association (e.g., VISA® or MASTERCARD®) associated with the transaction device 220. Based on receiving information associated with the transaction device 220 from the transaction terminal 210, one or more devices of the transaction backend system 240 may communicate to authorize a transaction and/or to transfer funds from an account associated with the transaction device 220 to an account of an entity (e.g., a merchant) associated with the transaction terminal 210.

The transaction frontend system 250 may include one or more devices capable of processing, authorizing, and/or facilitating a transaction. For example, the transaction frontend system 250 may include one or more servers and/or computing hardware (e.g., in a cloud computing environment or separate from a cloud computing environment) configured to receive and/or store information associated with processing an electronic transaction. The transaction frontend system 250 may process a transaction, such as to approve (e.g., permit, authorize, or the like) or decline (e.g., reject, deny, or the like) the transaction and/or to complete the transaction if the transaction is approved. The transaction frontend system 250 may communicate with the transaction backend system 240 to process the transaction based on information received from the transaction terminal 210, such as transaction data (e.g., information that identifies a transaction amount, a merchant, a time of a transaction, a location of the transaction, or the like), account information communicated to the transaction terminal 210 by the transaction device 220, and/or information stored by the transaction backend system 240 (e.g., for fraud detection).

The network 260 may include one or more wired and/or wireless networks. For example, the network 260 may include a cellular network, a public land mobile network, a local area network, a wide area network, a metropolitan area network, a telephone network, a private network, the Internet, and/or a combination of these or other types of networks. The network 260 enables communication among the devices of environment 200. In some implementations, the transaction terminal 210 may communicate with the transaction device 220 using a first network (e.g., a contactless network or by coming into contact with the transaction device 220) and may communicate with the transaction backend system 240 and/or the transaction frontend system 250 using a second network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
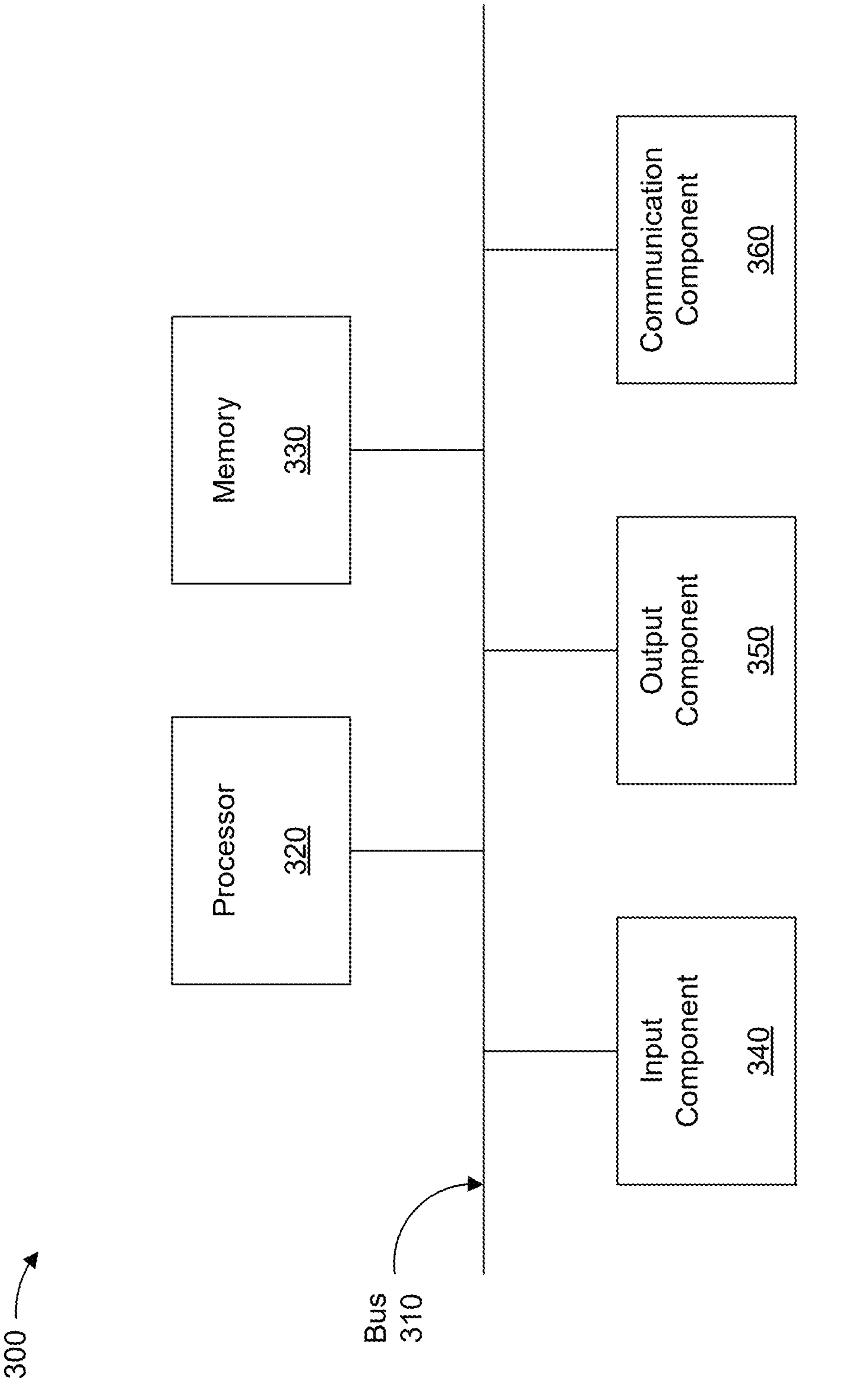
FIG. 3 is a diagram of example components of a device associated with a virtual credential to support continuity following migration of a deactivated credential, in accordance with some embodiments of the present disclosure.

FIG. 3 is a diagram of example components of a device 300 associated with a virtual credential to support continuity following migration of a deactivated credential. The device 300 may correspond to the transaction terminal 210, the transaction device 220, the mobile device, the transaction backend system 240, and/or the transaction frontend system 250. In some implementations, the transaction terminal 210, the transaction device 220, the mobile device, the transaction backend system 240, and/or the transaction frontend system 250 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory).

The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
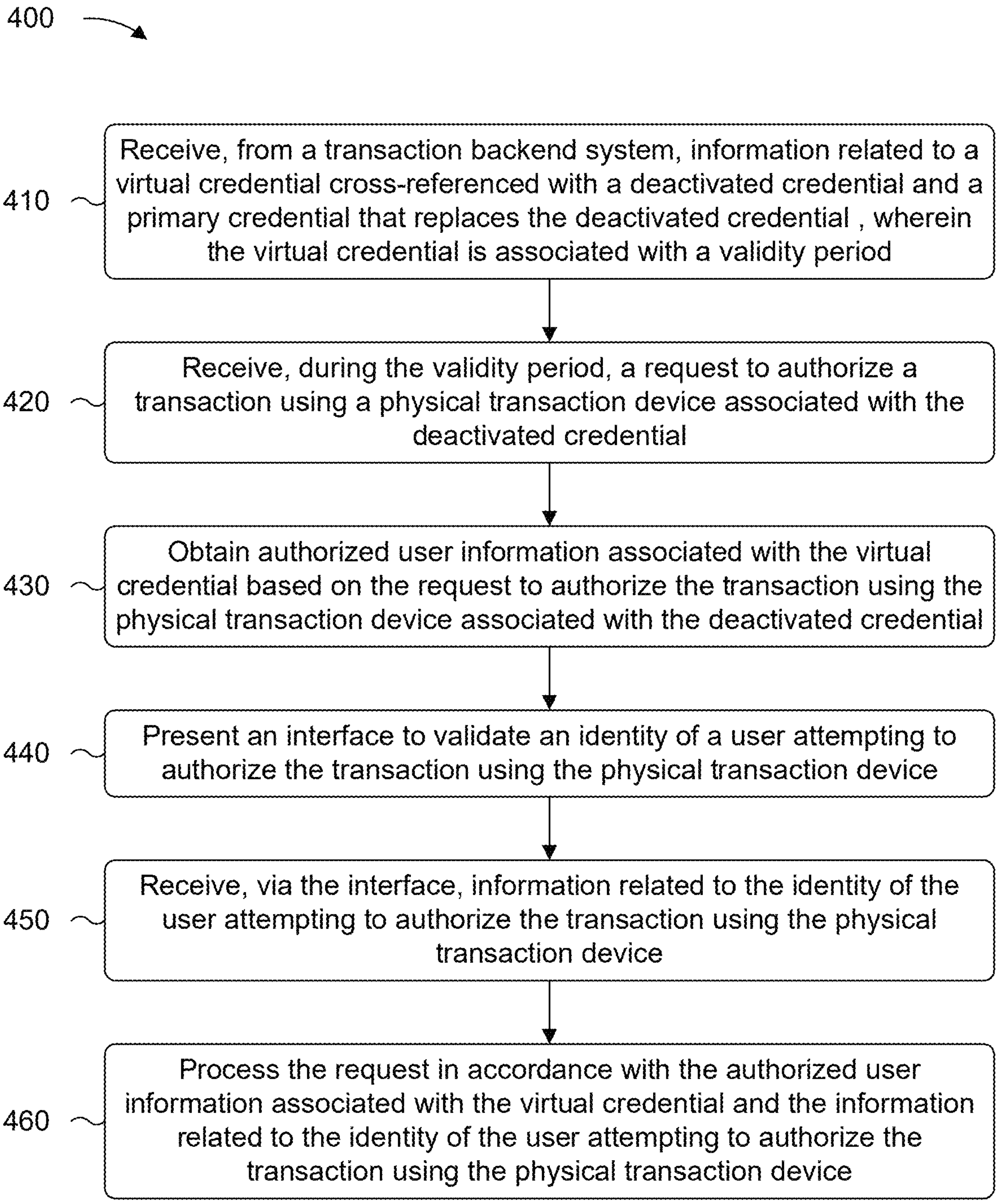
FIG. 4 is a flowchart of an example process associated with a virtual credential to support continuity following migration of a deactivated credential, in accordance with some embodiments of the present disclosure.

FIG. 4 is a flowchart of an example process 400 associated with a virtual credential to support continuity following migration of a deactivated credential. In some implementations, one or more process blocks of FIG. 4 may be performed by the transaction frontend system 250. In some implementations, one or more process blocks of FIG. 4 may be performed by another device or a group of devices separate from or including the transaction frontend system 250, such as the transaction terminal 210, the transaction device 220, the mobile device 230, and/or the transaction backend system 240. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving, from a transaction backend system, information related to a virtual credential cross-referenced with a deactivated credential and a primary credential that replaces the deactivated credential (block 410). For example, the transaction frontend system 250 (e.g., using processor 320, memory 330, input component 340, and/or communication component 360) may receive, from a transaction backend system, information related to a virtual credential cross-referenced with a deactivated credential and a primary credential that replaces the deactivated credential, as described above in connection with reference numbers 110 and 120 of FIG. 1A. In some implementations, the virtual credential is associated with a validity period. As an example, a cross-reference file may include information related to virtual credentials that are associated with deactivated credentials that have been migrated or converted to new primary credentials, and the virtual credentials may be associated with the new primary credentials by the transaction backend system. Furthermore, in some implementations, the cross-reference file may include one or more SAIDs that are associated with authorized users of the virtual credentials. Accordingly, the information in the cross-reference file can then be used to temporarily allow physical transaction devices associated with the deactivated credentials to be used for in-person transactions at transaction terminals associated with a merchant or other entity that initially issued the deactivated credentials.

As further shown in FIG. 4, process 400 may include receiving, during the validity period, a request to authorize a transaction using a physical transaction device associated with the deactivated credential (block 420). For example, the transaction frontend system 250 (e.g., using processor 320, memory 330, input component 340, and/or communication component 360) may receive, during the validity period, a request to authorize a transaction using a physical transaction device associated with the deactivated credential, as described above in connection with reference number 130 of FIG. 1A. As an example, the physical transaction device may be swiped or otherwise presented at a transaction terminal associated with a merchant or other entity that initially issued the deactivated credential.

As further shown in FIG. 4, process 400 may include obtaining authorized user information associated with the virtual credential based on the request to authorize the transaction using the physical transaction device associated with the deactivated credential (block 430). For example, the transaction frontend system 250 (e.g., using processor 320 and/or memory 330) may obtain authorized user information associated with the virtual credential based on the request to authorize the transaction using the physical transaction device associated with the deactivated credential, as described above in connection with reference number 140 of FIG. 1A. As an example, one or more APIs may be called or invoked using an account number or other identifier associated with the deactivated credential to determine whether the cross-reference file includes a virtual credential linked to the account number or other identifier associated with the deactivated credential. In cases where the reference file includes a virtual credential linked to the account number or other identifier associated with the deactivated credential, the SAIDs associated with authorized users of the virtual credential may be obtained from the cross-reference file to verify that the physical transaction device is being presented by an authorized user and not a malicious actor or fraudster.

As further shown in FIG. 4, process 400 may include presenting an interface to validate an identity of a user attempting to authorize the transaction using the physical transaction device (block 440). For example, the transaction frontend system 250 (e.g., using processor 320, memory 330, and/or output component 350) may present an interface to validate an identity of a user attempting to authorize the transaction using the physical transaction device, as described above in connection with reference number 150 of FIG. 1B. As an example, the transaction terminal may present a prompt for entering a social security number or other suitable unique identifying information to verify that the physical transaction device is being presented by an authorized user and not a malicious actor or fraudster.

As further shown in FIG. 4, process 400 may include receiving, via the interface, information related to the identity of the user attempting to authorize the transaction using the physical transaction device (block 450). For example, the transaction frontend system 250 (e.g., using processor 320, memory 330, input component 340, and/or communication component 360) may receive, via the interface, information related to the identity of the user attempting to authorize the transaction using the physical transaction device, as described above in connection with reference number 160 of FIG. 1B. As an example, the person presenting the physical transaction device may enter their social security number or other suitable unique identifying information into the prompt, using a keypad, pin pad, or other suitable input modality.

As further shown in FIG. 4, process 400 may include processing the request in accordance with the authorized user information associated with the virtual credential and the information related to the identity of the user attempting to authorize the transaction using the physical transaction device (block 460). For example, the transaction frontend system 250 (e.g., using processor 320 and/or memory 330) may process the request in accordance with the authorized user information associated with the virtual credential and the information related to the identity of the user attempting to authorize the transaction using the physical transaction device, as described above in connection with reference numbers 170, 180, and 190 of FIG. 1B. As an example, the information entered into the identity verification interface may be used to generate a SAID, which may be compared to the SAIDs associated with the authorized users of the virtual credential. If the SAID generated from the information entered into the identity verification interface matches the SAID associated with an authorized user of the virtual credential, the transaction may be authorized and settled using the virtual credential that is linked to the deactivated credential and the primary credential that replaced the deactivated credential. Alternatively, if the SAID generated from the information entered into the identity verification interface does not match a SAID associated with any of the authorized users of the virtual credential, or other suitable conditions are not satisfied (e.g., the virtual credential has already been used to facilitate a threshold number of transactions, the validity period of the virtual credential has elapsed, and/or fraud has been reported for the virtual credential), the transaction may be declined or rejected.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1B. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for processing payment transaction requests associated with deactivated credentials associated with migrated or converted private label credit cards of users, comprising:

one or more memories; and one or more processors, communicatively coupled to the one or more memories, configured to:

receive, from a transaction backend computing system, a cross-reference file that includes information related to a virtual credential cross-referenced with a deactivated credential and a primary credential that replaces the deactivated credential, wherein the information comprises a surrogate account identifier associated with a user of the primary credential, wherein the surrogate account identifier comprises a tokenized account number corresponding to a parent account of the user;

store the cross-reference file in a cross-reference data repository, wherein the deactivated credential corresponds to a private label credit card associated with a merchant, wherein the primary credential corresponds to a co-branded credit card that is associated with the merchant and a financial institution, wherein the primary credential is generated by the financial institution to replace the deactivated credential, and wherein the virtual credential temporarily allows the user to perform limited, in-person transactions using the private label credit card at a transaction terminal of the merchant, the merchant being associated with the private label credit card, wherein the limited, in-person transactions can only be performed during a validity period, the validity period occurring after the primary credential is generated by the financial institution to replace the deactivated credential;

receive, during the validity period, a request to authorize a transaction using the private label credit card;

obtain, based on the reception of the request during the validity period, authorized user information associated with the virtual credential based on the request to authorize the transaction using the private label credit card;

present an interface on a display screen to validate an identity of the user, wherein the user is attempting to authorize the transaction using the private label credit card;

receive, via the interface, information related to the identity of the user; and process the request in accordance with the surrogate account identifier associated with the virtual credential and the information related to the identity of the user.

2. The system of claim 1, wherein the one or more processors, to process the request, are configured to:

authorize the request based on the information related to the identity of the user matching the authorized user information associated with the virtual credential.

3. The system of claim 2, wherein the one or more processors, to authorize the request, are configured to:

send an authorization code associated with the virtual credential to the transaction backend computing system to associate the transaction using the private label credit card with the primary credential.

4. The system of claim 1, wherein the one or more processors, to process the request, are configured to:

reject the request based on the information related to the identity of the user failing to match the authorized user information associated with the virtual credential.

5. The system of claim 1, wherein the one or more processors are configured to obtain the authorized user information associated with the virtual credential based on the request occurring during the validity period associated with the virtual credential.

6. The system of claim 1, wherein the one or more processors are further configured to:

invalidate the virtual credential based on a fraud report associated with one or more of the virtual credential, the deactivated credential, or the primary credential.

7. The system of claim 1, wherein the one or more processors are further configured to:

invalidate the virtual credential after the validity period.

8. The system of claim 1, wherein the one or more processors are further configured to:

invalidate the virtual credential based on a quantity of transactions associated with the virtual credential satisfying a threshold.

9. A method for processing payment transaction requests associated with deactivated credentials associated with migrated or converted private label credit cards of users, comprising:

receiving, by a system and from a transaction backend computing system, a cross-reference file that includes information related to a virtual credential cross-referenced with a deactivated credential and a primary credential that replaces the deactivated credential, wherein the information comprises a surrogate account identifier associated with a user of the primary credential, wherein the surrogate account identifier comprises a tokenized account number corresponding to a parent account of the user;

storing, by the system, the cross-reference file in a cross-reference data repository, wherein the deactivated credential corresponds to a private label credit card associated with a merchant, wherein the primary credential corresponds to a co-branded credit card that is associated with the merchant and a financial institution, wherein the primary credential is generated by the financial institution to replace the deactivated credential, and wherein the virtual credential temporarily allows the user to perform limited, in-person transactions using the private label credit card at a transaction terminal of the merchant, the merchant being associated with the private label credit card, wherein the limited, in-person transactions can only be performed during a validity period, the validity period occurring after the primary credential is generated by the financial institution to replace the deactivated credential;

receiving, by the system and during the validity period, a request to authorize a transaction using the private label credit card;

obtaining, by the system and based on the reception of the request during the validity period, authorized user information associated with the virtual credential based on the request to authorize the transaction using the private label credit card;

presenting, by the system, an interface on a display screen to validate an identity of the user, wherein the user is attempting to authorize the transaction using the private label credit card;

receiving, by the system, via the interface, information related to the identity of the user; and authorizing the request based on the surrogate account identifier associated with the virtual credential and the information related to the identity of the user.

10. The method of claim 9, wherein authorizing the request comprises:

sending an authorization code associated with the virtual credential to the transaction backend computing system to associate the transaction using the private label credit card with the primary credential.

11. The method of claim 9, wherein the authorized user information associated with the virtual credential is obtained based on the request occurring during the validity period associated with the virtual credential.

12. The method of claim 9, further comprising:

invalidating the virtual credential based on a fraud report associated with one or more of the virtual credential, the deactivated credential, or the primary credential.

13. The method of claim 9, further comprising:

invalidating the virtual credential after the validity period.

14. The method of claim 9, further comprising:

invalidating the virtual credential based on a quantity of transactions associated with the virtual credential satisfying a threshold.

15. A non-transitory computer-readable medium for processing payment transaction requests associated with deactivated credentials associated with migrated or converted private label credit cards of users, the non-transitory computer-readable medium storing a set of instructions, the set of instructions comprising:

one or more instructions that, when executed by one or more processors of a system, cause the system to:

receive, from a transaction backend computing system, a cross-reference file that includes information related to a virtual credential cross-referenced with a deactivated credential and a primary credential that replaces the deactivated credential, wherein the information comprises a surrogate account identifier associated with a user of the primary credential, wherein the surrogate account identifier comprises a tokenized account number corresponding to a parent account of the user;

store the cross-reference file in a cross-reference data repository, wherein the deactivated credential corresponds to a private label credit card associated with a merchant, wherein the primary credential corresponds to a co-branded credit card that is associated with the merchant and a financial institution, wherein the primary credential is generated by the financial institution to replace the deactivated credential, and wherein the virtual credential temporarily allows the user to perform limited, in-person transactions using the private label credit card at a transaction terminal of the merchant, the merchant being associated with the private label credit card, wherein the limited, in-person transactions can only be performed during a validity period, the validity period occurring after the primary credential is generated by the financial institution to replace the deactivated credential;

receive, during the validity period, a request to authorize a transaction using the private label credit card;

present an interface on a display screen to validate an identity of the user, wherein the user is attempting to authorize the transaction using the private label credit card based on authorized user information associated with the virtual credential;

receive, via the interface, information related to the identity of the user; and process the request in accordance with the authorized user information the surrogate account identifier associated with the virtual credential and the information related to the identity of the user.

16. The non-transitory computer-readable medium of claim 15, wherein the one or more instructions, that cause the system to process the request, cause the system to:

authorize the request based on the information related to the identity of the user matching the authorized user information associated with the virtual credential.

17. The non-transitory computer-readable medium of claim 16, wherein the one or more instructions, that cause the system to authorize the request, cause the system to:

send an authorization code associated with the virtual credential to the transaction backend computing system to associate the transaction using the private label credit card with the primary credential.

18. The non-transitory computer-readable medium of claim 15, wherein the one or more instructions, that cause the system to process the request, cause the system to:

reject the request based on the information related to the identity of the user failing to match the authorized user information associated with the virtual credential.

19. The non-transitory computer-readable medium of claim 15, wherein the one or more instructions further cause the system to obtain the authorized user information associated with the virtual credential based on the request occurring during the validity period associated with the virtual credential.

20. The non-transitory computer-readable medium of claim 15, wherein the one or more instructions further cause the system to:

invalidate the virtual credential based on one or more of:

a fraud report associated with one or more of the virtual credential, the deactivated credential, or the primary credential, expiration of the validity period, or a quantity of transactions associated with the virtual credential satisfying a threshold.

* * * * *